Figure 1:
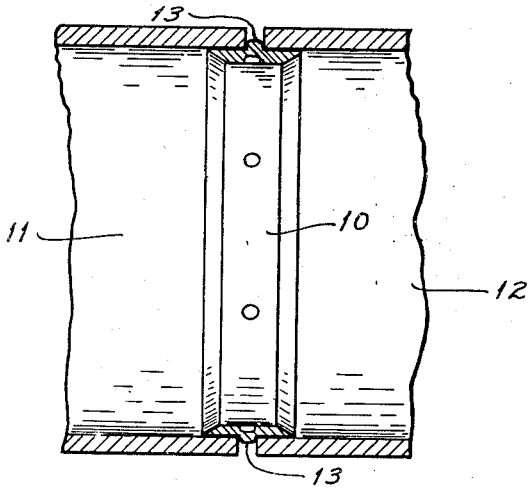

Jan. 2, 1945.  R. H. VON AHRENS  2,366,579

WELDING RING

Filed Aug. 2, 1943  2 Sheets-Sheet 1

ROBERT H. VON AHRENS
INVENTOR.

BY *E. A. Buckhorn*
ATTORNEY

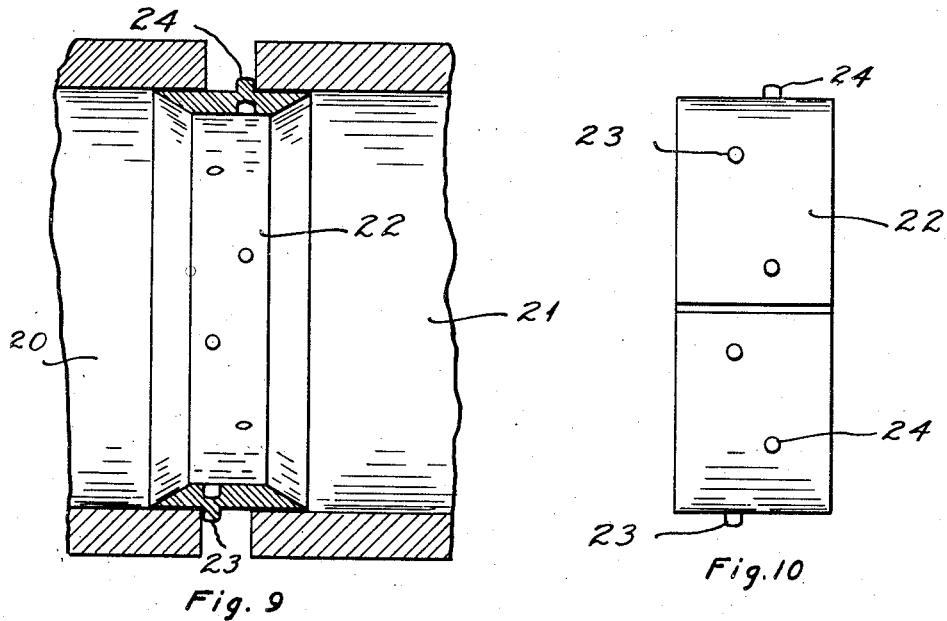

Patented Jan. 2, 1945

2,366,579

REISSUED

UNITED STATES PATENT OFFICE 2,366,579

WELDING RING

Robert H. von Ahrens, Portland, Oreg.

Application August 2, 1943, Serial No. 497,093

3 Claims. (Cl. 285—111)

The present invention relates to welding rings, or chill rings, and, while they are not necessarily limited thereto, they are particularly adaptable for facilitating the welding together of ends of pipe.

In the welding together of pipe ends a backing member, usually in the form of a metal ring, having an outer diameter substantially equal to the inside diameter of the pipe is inserted part way into the end of one pipe and the other pipe end is then slid over the projecting end of the ring. This ring, overlapping the gap between the adjacent pipe ends, functions in the manner of a backing strip designed to prevent the molten weld metal from flowing into the interior of the pipe forming icicles therein which would impede the fluid flow therethrough. The pipe ends are usually spaced a slight distance apart upon the ring so as to provide a gap for facilitating the insertion of a weld rod to the bottom of the groove in order that the entire end surfaces of the pipe ends may be solidly fused together.

Frequently means are provided directly upon the outer surface of the ring for automatically gauging the proper gap distance as the ring is inserted between the pipe ends. Such welding rings of this type, as have been devised heretofore, have possessed numerous disadvantages so that they were unsatisfactory either as to cost of manufacture or from the standpoint of usage.

Generally such gauging means consists of a ridge of an increased diameter extending circumferentially around the ring which is of a width corresponding to the width of the gap desired. Not only does the formation of such a ridge upon the ring entail a costly machining operation but such a continuous ridge seriously hinders the formation of a sound weld. It will be understood that the ridge extends upwardly above the innermost edge of the pipe and in order to effect solid fusion of metal between the entire end surfaces of the pipe the ridge on the welding ring must be entirely melted down. Oftentimes a welder will fail in this regard and merely fuse over the top of the ridge with a resultant imperfect weld. Other welders, being overly careful in the melting down of the ridge, will fuse entirely through the ring with the result that molten weld metal will string down into the interior of the pipe forming icicles in spite of the presence of the weld ring.

It is an object of the present invention to provide a new and improved welding ring which may be manufactured at relatively low cost and which may be used with improved results.

A further object of the invention is to provide a relatively inexpensive welding ring having gauging means provided on the peripheral surface which will not interfere with the welding operation and promote the formation of perfect weld joints extending across the full section of the pipe ends and throughout the full circumference thereof.

More specifically, it is an object of the invention to provide a new and improved welding ring having a plurality of circumferentially spaced gauging projections on the outer surface and which are engaged by the pipe ends at only substantially point contacts so as not to appreciably obstruct access by weld metal to the innermost edge of the pipe ends.

In accordance with the present invention a welding ring is provided having a plurality of relatively small protuberances projecting from the outer cylindrical surface of the ring and which are adapted to be abutted by the ends of the pipe sections to be welded together for spacing them apart a desired distance. The protuberances are of relatively small extent and mass so that they are readily melted down in the ordinary welding procedure without requiring any special precaution to reduce them to the innermost edge of the pipe end surfaces. Furthermore, these protuberances are engaged by the pipe ends only at points of limited contact area so that fusion with the inner edges of the pipe ends is not appreciably hindered thereby. The protuberances may be formed in any way so as to be firmly united to the ring surface and are only of such mass that they will not be sheared off upon fitting of the ring into the ends of the pipe.

For a consideration of what is believed novel and inventive the attention is directed to the following description taken in connection with the accompanying drawings, while the features of novelty will be pointed out with greater particularity in the appended claims.

Figure 2:
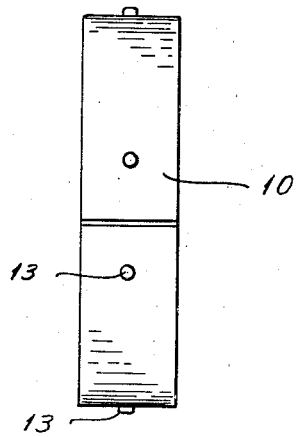
Figure 3:
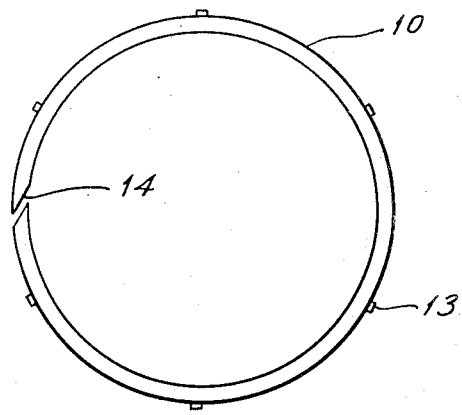
Figure 4:
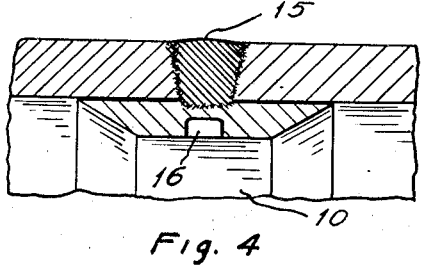

In the drawings Fig. 1 is a longitudinal sectional view illustrating a pair of pipe ends which are to be joined and a welding ring constructed in accordance with the present invention inserted in position therebetween; Fig. 2 is a side view of the ring shown in Fig. 1; Fig. 3 is an end view of the ring; Fig. 4 is an enlarged longitudinal sectional view illustrating a completed joint; Figs. 5, 6, 7 and 8 are a series of cross sectional views of different welding rings according to modifications of the invention; Fig. 9 is a longitudinal sectional view illustrating a pair of ends of heavy duty pipe which are to be joined and a welding ring for use therewith constructed in accordance with another modification of the invention; Fig. 10 is a side view of the ring shown in Fig. 9.

Referring first to Fig. 1 of the drawings, a welding ring constructed in accordance with one form of the invention is illustrated at 10 inserted in position between a pair of adjacent pipe ends 11 and 12 which are to be welded together. The ring 10 is formed of a suitable metal having such an outer diameter as to fit snugly against the inner walls of the pipe end.

Means are provided on the outer surface of the ring for projecting between the pipe ends so as to space them a slight distance apart for facilitating the fusion of weld metal with the innermost edges of the pipe and sections. While not necessarily limited thereto, the provision of the gap is particularly desirable in electric arc welding procedures in that the weld rod may readily be inserted to the bottom of the groove. As illustrated in Fig. 1, the gap gauging means comprises a plurality of spaced protuberances 13 extending in radial alignment from the outer circumference of the ring and substantially centrally of the ring surface. The protuberant portions are of a relatively small size, both as to height and as to length in the circumferential direction, while the width of the portions, in the axial direction, is, of course, limited to the width of the gap spacing.

While it is not essential to the practice of the present invention, it is preferred that the protuberant portions 13 be round in order that the contact area between such portions and the end surfaces of the pipes to be joined be a minimum. Being thus of relatively small mass and contacting the facing surfaces of the pipe ends only over a relatively small area, the protuberant portions 13 are readily melted to the bottom of the groove without requiring any special precaution in the welding operation and thereby insuring the carrying of the fusion to the innermost edges of the pipe ends.

A further important feature of the invention comprises the formation of the protuberances 13 by punching or stamping from the reverse side of the ring to a depth approximately half way through the thickness of the ring and extruding the protuberances, with the further aid of a die, from the outer surface. The ring may, furthermore, be formed from flat bar stock in which case the stamping operation may be performed with greater ease upon the metal in the flat condition. Long stock lengths of the bar thus stamped may be cut into required lengths and rolled into rings of the desired diameter. As more clearly illustrated in the end view of Fig. 3, the ends of the strip forming the ring are cut at a taper as indicated at 14 and the ring rolled to an outer diameter somewhat greater than the internal diameter of the pipe with which the ring is to be used. To insert the ring into the pipe ends it is compressed so that, following insertion and released, it will expand to engage firmly with the inside wall of the pipe and stay in place while the other pipe end is assembled over the opposite end of the ring. When the ring is inserted in position between a pair of pipe ends the gap between the beveled ends 14 is substantially closed so as not to provide an opening in the bottom of the groove through which molten weld metal may leak into the interior of the pipe.

The stock from which the welding rings 10 are formed may vary somewhat, depending, of course, upon the size of the pipe being dealt with. For example, for a three inch pipe, the ring may be one-eigth inch thick in which case the protuberances are raised to a height such as one-sixteenth of an inch above the outer surface. Approximately one-half of the cross section of the ring, or one-sixteenth of an inch, will then remain between the flat surface of the ring and the bottom of the recess left by the punch. Thus, as the protuberances 13 are melted down in the welding operation and the fusion carried down to the innermost edges of the pipe, a sufficient thickness of metal will remain in the ring for fusion with the weld metal and for normally preventing penetration therethrough to the bottom of the punch recesses. This is illustrated more clearly in the enlarged view of Fig. 4 which illustrates a completed weld joint at 15, the depth of fusion into the welding ring 10 being short of penetration into the punch recess 16 in the reverse side of the ring. It will readily be appreciated, however, that even though the fusion should penetrate through to the bottom of the recess, the recess is of such small diameter that any droplet of molten weld metal tending to seep therethrough will contact on all sides with the sides of the recess and be rapidly chilled thereby before having a chance to drip out into the interior of the pipe with the formation of an icicle. Even if not chilled, a convex meniscus will be formed due to the surface tension of the molten metal which will resist the tendency of the fluid mass to flow freely into the interior of the pipe. It has been observed that if the diameter of the punched protuberances, and hence of the recess formed thereby, is no greater than the normal gap spacing between the pipe ends, the molten metal will not flow from the lower end of the recess substantially before the full thickness of the ring adjacent the recess is completely melted through. This inherent tendency of the molten metal against flowing through the round opening is particularly true in the case of a ring which is relatively thick as compared with the diameter of the punched protuberance as illustrated in the drawings, the thickness of the ring being at least equal to half of the diameter of the protuberance. This is another important advantage resulting from stamping out only relatively small diameter protuberances from the outer ring surface.

It is obvious that only a relatively few protuberances are required to extend from the outer surface of the welding for effecting the gap spacing between the pipe ends. The number should be at least three, however.

Figure 5:
Figure 6:
Figure 7:
Figure 8:

The rings may be formed from stock dimension flat bar of rectangular cross section, as illustrated in Fig. 5, though it is preferred that the inner edges be beveled as shown in either Figs. 6 or 7. These edges may be beveled to any angle by a simple milling cutter before the flat lengths are cut and rolled into the ring shape. The half-oval shape illustrated in Fig. 8 may also be employed, it being a standard stock shape and consequently obviates the necessity for any machining operation to reduce the edge thickness. The beveled or half-oval cross sectional ring shapes are desirable if the welding rings are to be used in forming joints in pipe not having belled-out ends in that turbulence in the fluid flow through the pipe joints are thereby minimized.

In the case of pipes of heavy wall section, requiring the use of relatively large diameter weld rod, it may be necessary to provide a wider gap between the pipe ends than in the case of thin walled pipe. While protuberant portions of a width, or diameter, corresponding to that of the wider gap may be struck out from the welding ring, it is preferred not to unduly enlarge the size of these portions. To do so would mean the formation of a larger recess in the underside of the ring as well as appreciably increasing the mass of the protuberances themselves which is undesirable. Under such circumstances it is preferred to form the ring in a manner as is more clearly illustrated by the modification of Figs. 9 and 10 in which the protuberances each have a maximum dimension less than the width of the gap spacing.

Referring to Figs. 9 and 10, a pair of relatively heavy walled pipe ends 20 and 21 are shown having inserted therebetween a welding ring 22. The welding ring 22 is substantially similar to the welding ring as previously described except that it is somewhat heavier and provided with a double row of protuberances as indicated at 23 and 24 respectively. The protuberances of each row are preferably staggered with respect to those of the other row, the two rows being offset relative to each other to such an extent that the distance between the oppositely facing sides of the protuberances of the two rows corresponds with the width of gap desired to be provided between the adjacent pipe ends. By staggering the protuberances of the two rows the width of the gap may be varied from a minimum corresponding to the diameter of a single protuberance, in which case all of the protuberances extend in a common line, to any greater desired width by merely spreading the two groups of protuberances apart. The same set of dies may be used for punching the protuberances of both rows thus eliminating the necessity for providing a separate set of dies for each particular gap spacing desired. Arranged in this manner, the protuberances may be made of a minimum size merely sufficient to provide stops for the pipe ends to space them a desired distance apart. With such an arrangement of the gap gauging protuberant portions all of the advantages as described in connection with the welding ring 10 are retained while a gap spacing of any width may be provided thereby.

Having described the invention in what are considered to be preferred embodiments thereof, it is desired that it be understood that the specific examples shown and described are merely illustrative and that the invention may be carried out in other ways. It is intended in the following claims to cover all such variations and modifications as fall within the true spirit and scope of the invention.

I claim:

1. A welding ring comprising an annular metallic member having a cylindrical outer face, a plurality of integral substantially round protuberances punched out from the midsection of said member and spaced circumferentially about the outer surface thereof, said protuberances being formed by punching from the opposite side of said member, the protuberances being adapted to gauge apart a pair of adjacent pipe ends to be welded together and the cross sectional shape thereof being effective to substantially preclude flow of metal through the recess formed by the punching operation, the diameter of the recess formed by the punching out of the protuberances being sufficiently small so that surface tension alone prevents passage of molten metal therethrough when the protuberance is melted away by the welding process.

2. A welding ring comprising an annular metallic member having a cylindrical outer face, a plurality of integral substantially round protuberances punched out from the midsection of said member and spaced circumferentially about the outer surface thereof, said protuberances being formed by punching from the opposite side of said member, the protuberances having a diameter no greater than the gap to be formed thereby between a pair of adjacent pipe ends to be welded together and the cross sectional shape thereof being effective to substantially preclude flow of metal through the recess formed by the punching operation, the diameter of the recess formed by the punching out of the protuberances being sufficiently small so that surface tension alone prevents passage of molten metal therethrough when the protuberance is melted away by the welding process.

3. A welding ring comprising an annular metallic member having a cylindrical outer face, said member having outwardly tapered circumferential edges and being relatively thick in its midsection, a plurality of substantially round protuberances punched out from said midsection and spaced circumferentially about the outer surface of said member, said protuberances being formed by punching from the opposite side of said member to a depth corresponding substantially to one-half of the thickness of said midsection whereby the protuberances are integrally united with said member throughout the circumference of said protuberances by a thickness of metal corresponding to substantially one-half the thickness of said member, the protuberances being adapted to gauge apart a pair of adjacent pipe ends to be welded together and the cross sectional shape thereof being effective to substantially preclude flow of metal through the recess formed by the punching operation, the diameter of the recess formed by the punching out of the protuberances being sufficiently small so that surface tension alone prevents passage of molten metal therethrough when the protuberance is melted away by the welding process.

ROBERT H. von AHRENS.